US010231587B2

(12) United States Patent
Krebs et al.

(10) Patent No.: US 10,231,587 B2
(45) Date of Patent: Mar. 19, 2019

(54) CYCLONE MODULE FOR VACUUM CLEANER

(71) Applicant: BISSELL Homecare, Inc., Grand Rapids, MI (US)

(72) Inventors: Alan J. Krebs, Pierson, MI (US); Kenneth M. Lenkiewicz, Grand Rapids, MI (US)

(73) Assignee: BISSELL Homecare, Inc., Benton Harbor, MI (US)

(*) Notice: Subject to any disclaimer, the term of this patent is extended or adjusted under 35 U.S.C. 154(b) by 250 days.

(21) Appl. No.: 15/363,645

(22) Filed: Nov. 29, 2016

(65) Prior Publication Data

US 2017/0156559 A1 Jun. 8, 2017

Related U.S. Application Data

(60) Provisional application No. 62/263,132, filed on Dec. 4, 2015.

(51) Int. Cl.
A47L 9/16 (2006.01)
B01D 45/00 (2006.01)
A47L 5/28 (2006.01)
A47L 9/24 (2006.01)

(52) U.S. Cl.
CPC .............. A47L 9/1608 (2013.01); A47L 5/28 (2013.01); A47L 9/1625 (2013.01); A47L 9/1633 (2013.01); A47L 9/1683 (2013.01); A47L 9/24 (2013.01)

(58) Field of Classification Search
CPC . A47L 5/28; A47L 9/1608; A47L 9/24; A47L 9/1633; A47L 9/1625; A47L 9/1683; A47L 9/16; B01D 45/00

USPC .... 15/352, 347; 55/343, 345, 428, 429, 432, 55/44, DIG. 3
See application file for complete search history.

(56) References Cited

U.S. PATENT DOCUMENTS

| 6,344,064 | B1 | 2/2002 | Conrad |
| 6,582,489 | B2 | 6/2003 | Conrad |
| 8,978,199 | B2 | 3/2015 | Kasper et al. |
| 9,009,914 | B2 | 4/2015 | Tran |
| 9,901,230 | B2 * | 2/2018 | Caro .......................... A47L 9/04 |
| 2005/0198771 | A1 | 9/2005 | Min et al. |
| 2015/0289738 | A1 | 10/2015 | Tran |
| 2017/0265697 | A1 * | 9/2017 | Conrad .................. A47L 5/365 |

FOREIGN PATENT DOCUMENTS

| EP | 1905335 A1 | 4/2008 |
| EP | 2684500 A2 | 1/2014 |
| WO | 2002067752 A1 | 9/2002 |

OTHER PUBLICATIONS

Claus Blumenberg, European Search Report, dated Apr. 4, 2017, 7 pages, Munich.

* cited by examiner

Primary Examiner — David Redding
(74) Attorney, Agent, or Firm — McGarry Bair PC

(57) ABSTRACT

A cyclone module for a vacuum cleaner includes a primary separator, a bulk collection chamber, at least one secondary separator and a fines collection chamber. First and second doors are provided for closing debris outlets at the bottom ends of the bulk and fines collection chambers, respectively. The fines collection chamber is elevated within the bulk collection chamber, with the second door spaced above the first door.

20 Claims, 11 Drawing Sheets

CYCLONE MODULE FOR VACUUM CLEANER

CROSS-REFERENCE TO RELATED APPLICATION(S)

This application claims the benefit of U.S. Provisional Patent Application No. 62/263,132, filed Dec. 4, 2015, which is incorporated herein by reference in its entirety.

BACKGROUND

Upright vacuum cleaners employ a variety of dirt separators to remove dirt and debris from a working air stream. Some dirt separators use one or more frusto-conical-shaped separator(s) and others use high-speed rotational motion of the air/dirt to separate the dirt by centrifugal force. Typically, working air enters and exits at an upper portion of the dirt separator as the bottom portion of the dirt separator is used to collect debris. Before exiting the dirt separator, the working air may flow through an exhaust grill. The exhaust grill can have perforations, holes, vanes, or louvers defining openings through which air may pass.

A dirt collector can be provided for collecting the removed dirt from the working air stream, and can be separate or integral with the dirt separator. In vacuum cleaners where the dirt separator and collector are integral, the entire separator/collector assembly can be removable from the vacuum cleaner for emptying collected dirt. In some cases, a bottom wall of the dirt collector serves as a dirt door, and is provided with a release mechanism for opening the dirt door to empty the accumulated contents.

Some cyclonic dirt separators have two separation stages, and use a dirt collector with individual chambers for receiving dirt separated at each stage. In one design, dirt from the second or downstream separation stage is collected within a centrally-located tube that meets the bottom wall of the dirt collector that serves as the dirt door.

BRIEF SUMMARY

In one aspect, the invention relates to a cyclone module for a vacuum cleaner. The cyclone module includes a module housing defining a longitudinal axis of the module, a primary separator comprising a cyclone chamber, a bulk collection chamber having bottom end defining a first debris outlet, at least one secondary separator fluidly downstream from the primary separator, a fines collection chamber having a bottom end defining a second debris outlet, a first door coupled with the module housing and closing the first debris outlet, and a second door spaced above the first door along the axis and closing the second debris outlet. The bottom end of the fines collection chamber is above the bottom end of the bulk collection chamber, with the second debris outlet spaced above the first door along the longitudinal axis of the module.

DESCRIPTION OF EMBODIMENTS OF THE INVENTION

The invention generally relates to a cyclone module for a vacuum cleaner, which may be in the form of an upright vacuum cleaner, a hand-held vacuum cleaning device, or as an apparatus having a floor nozzle or a hand-held accessory tool connected to a canister or other portable device by a vacuum hose or conduit. Additionally, in some embodiments of the invention the vacuum cleaner can have fluid delivery capability, including applying liquid or steam to the surface to be cleaned, and/or fluid extraction capability. As used herein, the terms "dirt" and "debris" are used interchangeably, and encompass dirt, dust, soil, hair, and other debris.

One embodiment of the cyclone module has an elevated fines catcher and a dirt door that empties the primary and secondary dirt collection chambers simultaneously. Other embodiments of the cyclone module include a combination of the elevated fines collector feature with simultaneous debris chamber emptying, hair/debris management features and/or improved filtration.

In yet another embodiment, the cyclone module can include an elevated fines catcher with a fines door, independent of the primary dirt door and configured to automatically close when the cyclone module is under vacuum and automatically open when vacuum inside the cyclone module ceases, i.e. when a working air flow through the cyclone module stops.

In additional embodiments, the cyclone module can have individual dirt doors associated with each of the primary and secondary dirt collection chambers respectively. The primary door and fines catcher door can be actuated simultaneously or independently.

The elevated fines catcher provides more space for debris collection in the primary collection chamber. Also, the swirling airflow within the cyclone module tends to agglomerate dust and hair into a ball at the center of the tank. Previous designs with centrally located fines collector tube extend the fines collector tube all the way to the bottom of the tank, which often includes a bottom-empty door. Thus, eliminating a traditional fines collector tube that typically occupies the center of the tank, allows the swirling airflow to ball-up the dust and hair more effectively. An unobstructed bottom tank has less turbulence. This also allows for a centrally located fines separator that empties as the first collection chamber empties.

As used herein, the term "separator" or "dirt separator" or "debris separator" is inclusive of cyclones or cyclonic separators, separator screens having a mesh material, and grills, including grills having a perforated or louvered side wall.

One example of a suitable vacuum cleaner in which the various embodiments of the cyclone module disclosed herein can be used is disclosed in U.S. Patent Application Publication No. 2015/0289738, published Oct. 15, 2015, now U.S. Pat. No. 9,693,664, issued Jul. 4, 2017, which is incorporated herein by reference in its entirety and shown in FIG. 1.

Figure 1:
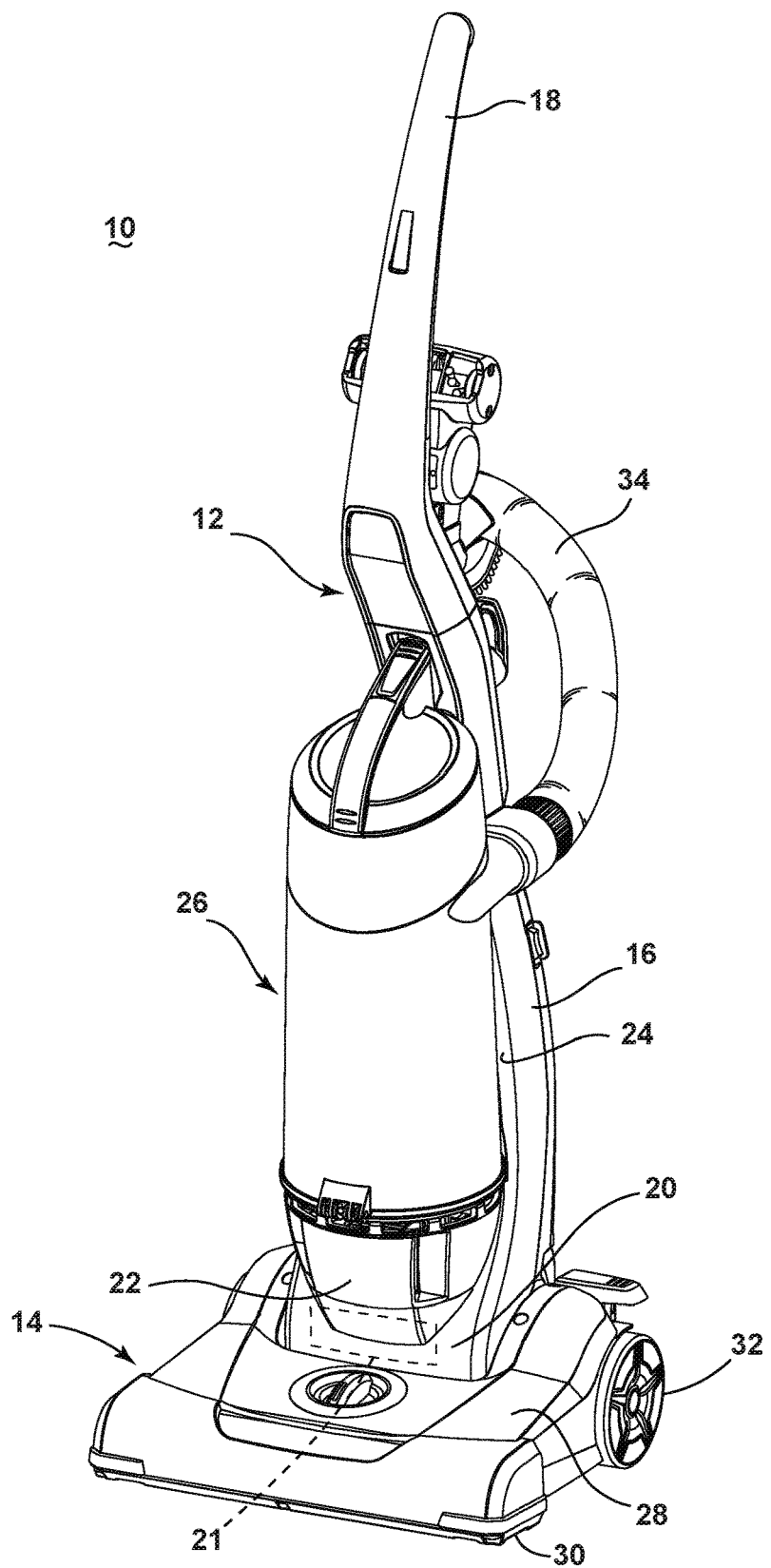
FIG. 1 is a perspective view of a vacuum cleaner that can be provided with a cyclone module according to any embodiment of the invention.

Referring to FIG. 1, the upright vacuum cleaner 10 comprises an upright handle assembly 12 pivotally mounted to a foot assembly 14. For purposes of description related to the figures, the terms "upper," "lower," "right," "left," "rear," "front," "vertical," "horizontal," and derivatives thereof shall relate to the invention as oriented in FIG. 1 from the perspective of a user behind the vacuum cleaner, which defines the rear of the vacuum cleaner. However, it is to be understood that the invention may assume various alternative orientations, except where expressly specified to the contrary.

The handle assembly 12 further comprises a primary support section 16 with a grip 18 on one end to facilitate movement by a user. A motor cavity 20 is formed at an opposite end of the handle assembly 12 to contain a conventional suction source such as a vacuum fan/motor assembly 21 oriented transversely therein and which is configured to generate a working airstream through a working air path of the vacuum cleaner that extends from a "dirty" air inlet to a "clean" air outlet. The vacuum fan/motor assembly can form a portion of the working air path. The handle assembly 12 pivots relative to the foot assembly 14 through a pivot axis that is coaxial with a motor shaft (not shown) associated with the vacuum fan/motor assembly 21. A post-motor filter housing 22 is formed above the motor cavity 20 and is in fluid communication with the vacuum fan/motor assembly 21, and receives a filter media (not shown) for filtering air exhausted from the vacuum fan/motor assembly 21 before the air exits the vacuum cleaner 10 through the air outlet. A mounting section 24 on the primary support section 16 of the handle assembly 12 receives a cyclone module 26 for separating dirt and other contaminants from the working airstream, and can form a portion of the working air path. The cyclone module 26 can be any embodiment of the cyclone module described herein.

The foot assembly 14 comprises a housing 28 with a suction nozzle 30 formed at a lower surface thereof and that is in fluid communication with the vacuum fan/motor assembly 21. The suction nozzle 30 defines the air inlet of the working air path. While not shown in FIG. 1, an agitator can be positioned within the housing 28 adjacent the suction nozzle 30 and operably connected to a dedicated agitator motor, or to the vacuum fan/motor assembly 21 within the motor cavity 20 via a stretch belt. Rear wheels 32 are secured to a rearward portion of the foot assembly 14 and front wheels (not shown) are secured to a forward portion of the foot assembly 14 for moving the foot assembly 14 over a surface to be cleaned. When the cyclone module 26 is received in the mounting section 24, as shown in FIG. 1, the cyclone module 26 is in fluid communication with, and fluidly positioned between, the suction nozzle 30 and the vacuum fan/motor assembly 21 within the motor cavity 20. At least a portion of the working air path between the suction nozzle 30 and the cyclone module 26 can be formed by a vacuum hose 34 that can be selectively disconnected from fluid communication with the suction nozzle 30 for above-the-floor cleaning.

Figure 2:
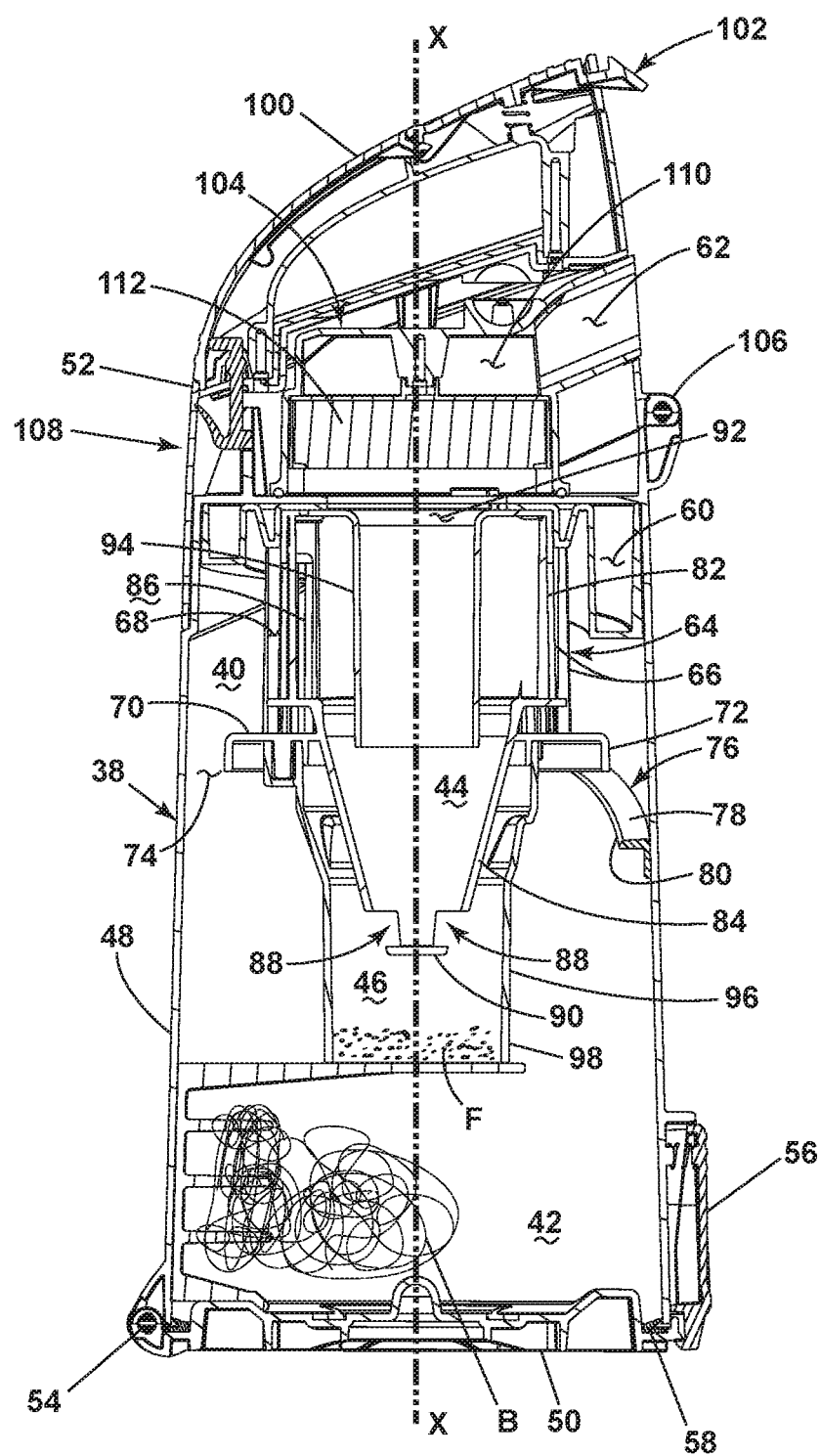
FIG. 2 is a sectional view of a first embodiment of a cyclone module for a vacuum cleaner.
Figure 3:
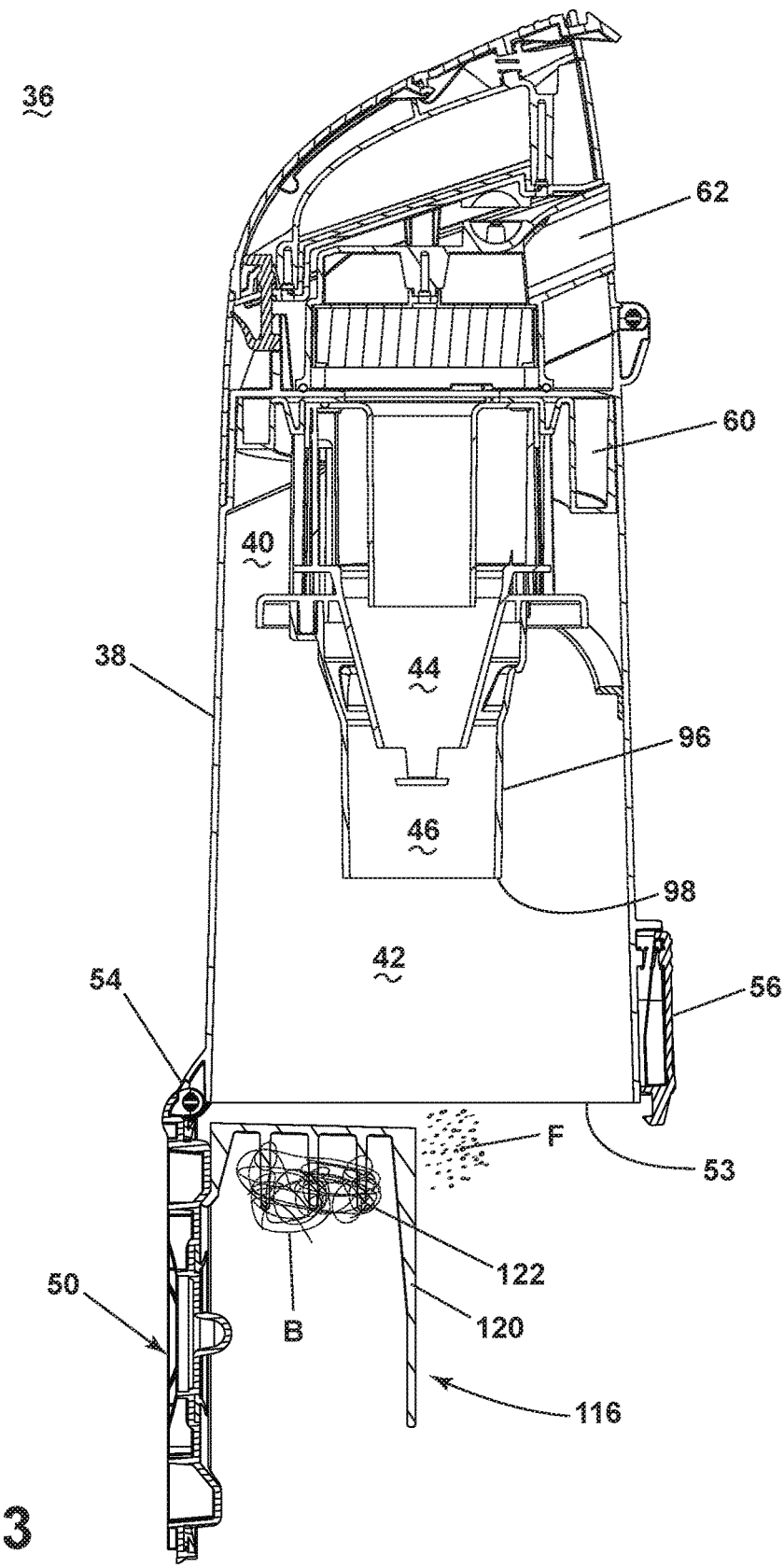
FIG. 3 is a sectional view of the cyclone module from FIG. 2, with a dirt door in an open position.

FIGS. 2-3 are sectional views of a first embodiment of a cyclone module 36 for a vacuum cleaner. The cyclone module 36 can be used as the cyclone module 26 of the vacuum cleaner 10 shown in the FIG. 1, or for another vacuum cleaner. The cyclone module 36 of the first embodiment comprises a housing 38 at least partially defining a two-stage cyclone separator including a first stage defined by a first cyclone chamber 40 for separating contaminants from a dirt-containing working airstream and an associated first or bulk dirt collection chamber 42 which receives contaminants separated by the first cyclone chamber 40, and a second stage defined by a second cyclone chamber 44 for separating contaminants from the working airstream received from the first stage and an associated second or fines dirt collection chamber 46 which receives contaminants separated by the second cyclone chamber 44. One or both of the cyclonic stages can be centered on a central axis X of the cyclone module 36, which can extend longitudinally through the housing 38. Further, the first and second stages can be concentric, with the second stage positioned within the first stage and both centered on the central axis X. It is noted that while a two-stage cyclone separator is illustrated herein, it is also contemplated that the cyclone module 36 can be configured with additional separation stages or one separation stage.

The module housing 38 is common to the first cyclone chamber 40 and the bulk collection chamber 42, and includes a side wall 48, a bottom wall 50, and a cover 52. The side wall 48 is illustrated herein as being generally cylindrical in shape, with a diameter that increases in a direction toward the bottom wall 50. The side wall 48 includes a lower or bottom edge 53 that defines a debris outlet for the bulk collection chamber 42. The bottom wall 50 in the illustrated embodiment comprises a dirt door that can be selectively opened, such as to simultaneously empty the contents of the collection chambers 42, 46.

The dirt door 50 is pivotally mounted to the side wall 48 by a hinge 54. A door latch 56 is provided on the side wall 48, opposite the hinge 54, and can be actuated by a user to selectively release the dirt door 50 from engagement with the bottom edge of the side wall 48. The door latch 56 is illustrated herein as comprising a latch that is pivotally mounted to the side wall 48 and spring-biased toward a closed position shown in FIG. 2. By pressing the upper end of the door latch 56 toward the side wall 48, the lower end of the door latch 56 pivots away from the side wall 48 and releases the dirt door 50, under the force of gravity, to an open position shown in FIG. 3, allowing accumulated dirt to be emptied from the collection chambers 42, 46 through the open bottom of the module housing 38. A gasket 58 can be provided between the dirt door 50 and the bottom edge of the side wall 48 to seal the interface therebetween when the dirt door 50 is closed.

An air inlet to the cyclone module 36 can be at least partially defined by an inlet conduit 60. An air outlet from the cyclone module 36 can be at least partially defined by an outlet conduit 62 extending from the cover 52. The inlet conduit 60 is in fluid communication with the suction nozzle 30 (FIG. 1) and the outlet conduit 62 is in fluid communication with the vacuum fan/motor assembly 21 within the motor cavity 20 (FIG. 1).

The cyclone module 36 further includes a grill 64 for guiding working air from the first cyclone chamber 36 into the second cyclone chamber 44. The grill 64 can be positioned in the center of the cyclone chamber 36 and includes a generally cylindrical body having a plurality of vanes or louvers 66 extending longitudinally between lower and upper ends of the grill 64. Openings 68 are formed between adjacent louvers 66 through which air can pass. As illustrated, the louvers 68 are elongated along the direction of the central axis of the of the cyclone module 36. While not shown, a foam or paper filter may be provided on the exterior or interior of the grill 64.

A separator plate 70 extending radially outwardly from a lower end of the grill 64 and includes a downwardly depending peripheral lip 72. The separator plate 70 separates the first cyclone chamber 40 from the bulk dirt collection chamber 42 and can define the boundary therebetween. A first stage debris passage 74 from the first cyclone chamber 40 can be defined between the separator plate 70 and the side wall 48. The first stage debris passage 74 may extend continuously around the outer circumference of the separator plate 70 and the inner circumference of the side wall 48.

Optionally, a helical dirt guide 76 can be provided within the first dirt collection chamber to direct or urge debris to the bottom of the first dirt collection chamber and prevent re-entrainment of debris into the first cyclone chamber 40. The helical dirt guide 76 includes a ledge 78 extending from the inner wall of the module housing 38 toward the cyclone axis X, with the ledge following a generally helical trajectory and having a free edge 80. The helical dirt guide 76 is below the debris passage 74 and below the separator plate 70, such that no portion of the helical dirt guide 76 is within the first cyclone chamber 40, because a dirt guide 76 positioned therein could potentially disrupt or hinder cyclonic separation action of dirt from the working air flow within the first cyclone chamber 40.

The second cyclone chamber 44 is fluidly positioned downstream of the grill 64, and is defined by a second stage cyclone body having an upper cylindrical portion 82 and a lower frusto-conical portion 84. At least one air inlet 86, for example a pair of opposed air inlets, is formed in the upper cylindrical portion 82 to provide a passage for air into the second cyclone chamber 44. At least one second stage debris passage 88 is formed in the bottom of the frusto-conical portion 84. A vortex stabilizer 90 can be provided at the bottom of the frusto-conical portion 84, with the debris passage 88 provided just above the vortex stabilizer 90.

An upper end of the cyclone body further includes a central opening 92 allowing air to pass out of the second stage and therefore defines an air outlet of the second stage. A vortex finder 94 can surround the central opening and extend downwardly through at least the cylindrical portion 82, and optionally partially into the frusto-conical portion 84. The vortex finder 94 can be provided as a tubular conduit that has an open lower end.

The fines dirt collection chamber 46 is generally located underneath the cyclone body to collect dirt from the second stage debris passage 88. The fines dirt collection chamber 46 can be positioned in the center of the module housing 38, and aligned with the cyclone axis X. The fines dirt collection chamber 46 comprises a tubular chamber sidewall 96 defining a fines collection tube having an open bottom edge 98. The chamber sidewall 96 extends below the dirt passage 88 and optionally a portion of the chamber sidewall 96 can extend above the passage outlet 88 also. The bottom edge 98 of the chamber sidewall 96 defines a debris outlet for the fines collection chamber 46, and is spaced from the dirt door 50, such that the chamber sidewall 96, and therefore the fines dirt collection chamber 46, does not meet the dirt door 50 when the dirt door 50 is closed.

The cover 52 can include a carry handle 100 that can be gripped by a user to facilitate lifting and carrying the entire vacuum cleaner 10 or just the cyclone module 36 when removed from the vacuum cleaner 10. The cover 52 can further include a module latch assembly 102, a pre-motor filter assembly 104 and the outlet conduit 62 for exhausting working air from the cyclone module 36. The cover 52 can be pivotally mounted to the module housing 38 by a hinge 106. A cover latch assembly 108 can be provided opposite the hinge 106, and can be actuated by a user to selectively release the cover 52 from the closed position shown in FIG. 2. The module latch assembly 102 includes a latch on the cyclone module 36 and a corresponding latch receiver (not shown) provided on the upright assembly 12 of the vacuum cleaner 10 (FIG. 1), and is used to selectively coupler or release the cyclone module 36 from the primary support section 16.

Downstream of the second stage, the working airflow passes through the pre-motor filter assembly 104 before reaching the suction source 21. The pre-motor filter assembly 104 includes a filter chamber 110 and a filter media 112 removably received within the filter chamber 110. Some non-limiting examples of suitable filter media 112 include a non-porous or porous media, or a pleated or non-pleated media. For example, the filter media can be a non-porous, pleated filter, such as a HEPA filter. In another example, the filter media can be a porous, non-pleated filter, such as a sponge-type filter.

The outlet conduit 62 can communicate with the filter chamber 110 to conduct working air that has been filtered by the filter media 112 toward the suction source 21. As illustrated herein, the outlet conduit 62 can extend from a wall of the filter chamber 110. It is noted that working air flows through the filter media 112 from a lower, upstream end to an upper, downstream end of the media. When the cover 52 is opened by pivoting about the hinge 106, the upstream end of the filter media 112 will be immediately visible to the user so that a user can assess whether the filter media 112 needs cleaning or replacement without having to touch any component of the filter assembly 104 itself.

Figure 4:
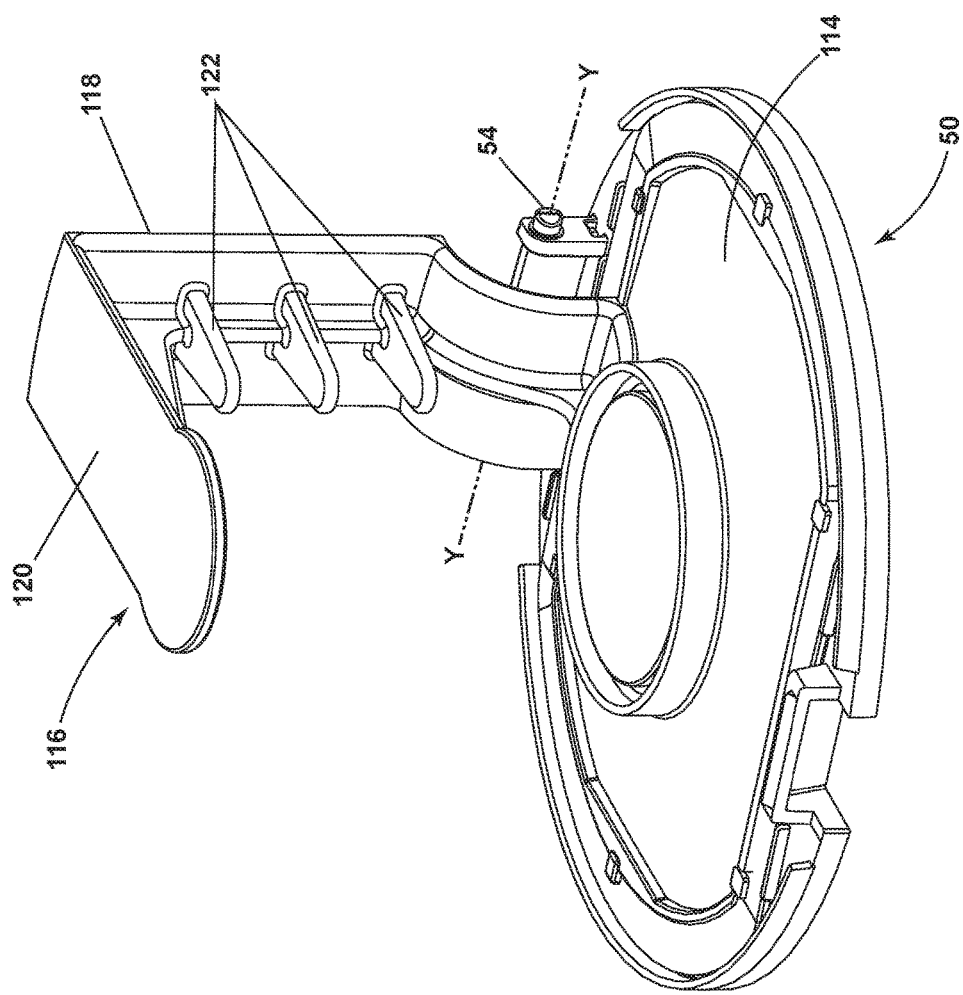
FIG. 4 is a perspective view of the dirt door of the cyclone module from FIG. 2.

FIG. 4 is a perspective view of the dirt door 50 of the cyclone module 36 from FIG. 2. The dirt door 50 includes a first door body 114 for closing the bulk dirt collection chamber 42 and a platform 116 extending above the first door body 114 for closing the fines dirt collection chamber 46. The platform 116 comprises an L-shaped support member 118 having one end fastened to the first door body 114 and a second end that defines a fines empty door 120. The support 118 is attached to the first door body 114 near a pivot axis Y of the dirt door 50 defined by the hinge 54 so that when the dirt door 50 is opened, the fines empty door 120 swings away from the bottom edge 98 of the chamber sidewall 96 together with the first door body 114 so that debris can be emptied out of the bulk and fines collection chambers 42, 46 simultaneously.

The support 118 can further comprise ribs or tines 122 that protrude laterally towards the central axis X of the cyclone module 36. The tines 122 are configured to collect and prevent re-entrainment of hair and other debris in the bulk collection chamber 42. Upon opening the dirt door 50, the tines 122 pivot with the dirt door 50 and become oriented downwardly so that any debris collected thereon slides off and can be released into a waste container, as shown in FIG. 3. The tines 122 are elongated such that the tines 122 have a length that is substantially greater than their thickness, and can have a rod-like or conical shape, which tends to improve shedding and release of debris when the dirt door 50 is opened.

In operation, the suction source 21, when energized, draws dirt and dirt-containing air from the suction nozzle 30

(FIG. 1) to the inlet conduit 60 and into the cyclone module 36, where the dirty air swirls around the first cyclone chamber 40. Larger or coarser debris B falls into the bulk collection chamber 42. For illustration purposes, the bulk debris B is drawn as elongated hair or threads, but that other types of debris may also be collected in the bulk collection chamber 42. The working air, which may still contain some smaller or finer debris, then passes through the grill 64, which can separate out some additional debris, and then into the second cyclone chamber 44. The working air continues to swirl around the inside of the second cyclone chamber 44, which causes smaller or finer debris F to separate and fall into the fines collection chamber 46. For illustration purposes, the fine debris F is drawn as particulates, but that other types of debris may also be collected in the fines collection chamber 46. The working air, which may still contain some even smaller or finer debris, proceeds upwardly within the vortex finder 94 and enters the pre-motor filer assembly 104, where additional debris may be captured by the filter media 112. The working air then exits the cyclone module 36 via the outlet conduit 62, and passes through the suction source 21 before being exhausted from the vacuum cleaner 10. One or more additional filter assemblies may be positioned upstream or downstream of the suction source 21. To dispose of collected debris, the cyclone module 36 is detached from the vacuum cleaner 10 to provide a clear, unobstructed path for the debris to be emptied. Debris are emptied by opening the dirt door 50, which simultaneously empties the debris B, F collected in the bulk and fines collection chambers 42, 46.

Figure 5:
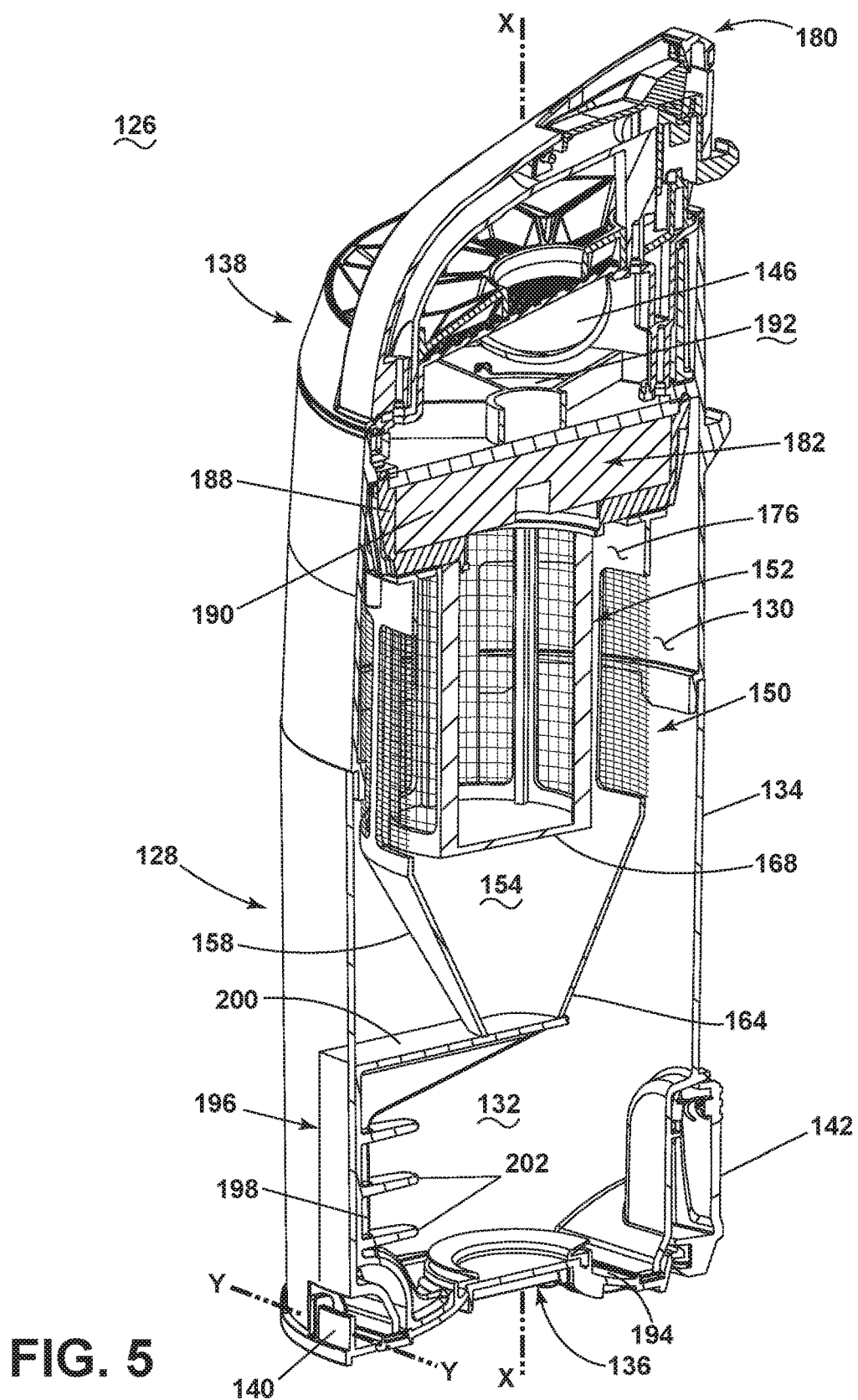
FIG. 5 is a perspective sectional view of a second embodiment of a cyclone module for a vacuum cleaner.

FIG. 5 is a perspective sectional view of a second embodiment of a cyclone module 126 for a vacuum cleaner. The cyclone module 126 can be used as the cyclone module 26 of the vacuum cleaner 10 shown in the FIG. 1, or for another vacuum cleaner. The cyclone module 126 of the second embodiment comprises a housing 128 at least partially defining a one-cyclone-stage cyclone separator including a cyclone chamber 130 for separating contaminants from a dirt-containing working airstream and an associated first or bulk collection chamber 132 which receives contaminants separated by the cyclone chamber 130. The cyclonic chamber 130 can be centered on a central axis X of the cyclone module 126, which can extend longitudinally through the housing 128. It is noted that while a one-cyclone-stage cyclone separator is illustrated herein, it is also contemplated that the cyclone module 126 can be configured with additional cyclonic separation stages.

The module housing 128 is common to the cyclone chamber 130 and the bulk collection chamber 132, and includes a side wall 134, a bottom wall 136, and a cover 138. The side wall 134 is illustrated herein as being generally cylindrical in shape, with a diameter that increases in a direction toward the bottom wall 136. The side wall 134 includes a lower or bottom edge 139 that defines a debris outlet for the bulk collection chamber 132. The bottom wall 136 in the illustrated embodiment comprises a dirt door that can be selectively opened, such as to empty the contents of the bulk collection chamber 132.

The dirt door 136 is pivotally mounted to the side wall 134 by a hinge 140. A door latch 142 is provided on the side wall 134, opposite the hinge 140, and can be actuated by a user to selectively release the dirt door 136 from engagement with the bottom edge of the side wall 134. The door latch 142 is illustrated herein as comprising a latch that is pivotally mounted to the side wall 134 and spring-biased toward a closed position shown in FIG. 5. By pressing the upper end of the door latch 142 toward the side wall 134, the lower end of the door latch 142 pivots away from the side wall 134 and releases the dirt door 136, under the force of gravity, to an open position, allowing accumulated dirt to be emptied from the bulk collection chamber 132 through the open bottom of the module housing 128, and also from a fines collection chamber as described in further detail below.

Figure 6:
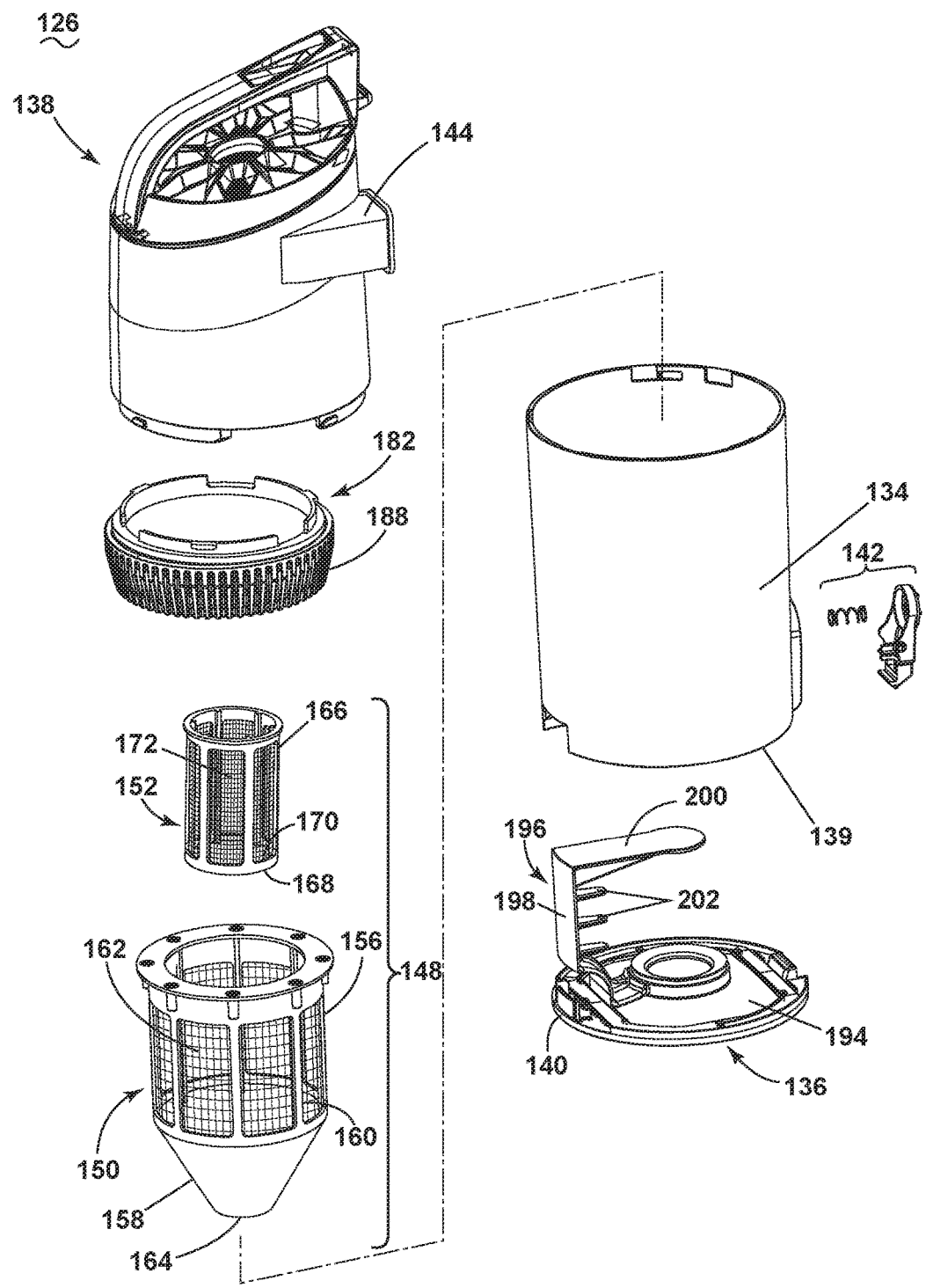
FIG. 6 is an exploded view of the cyclone module from FIG. 5.

With additional reference to FIG. 6, an air inlet to the cyclone module 126 can be at least partially defined by an inlet conduit 144. An air outlet from the cyclone module 126 can be at least partially defined by an outlet conduit 146 extending from the cover 138. The inlet conduit 144 is in fluid communication with the suction nozzle 30 (FIG. 1) and the outlet conduit 146 is in fluid communication with the vacuum fan/motor assembly 21 within the motor cavity 20 (FIG. 1).

The cyclone module 126 further includes an additional separator 148 within the module housing 128, fluidly downstream of the cyclone chamber 130. The separator 148 can be positioned in the center of the cyclone module 126 and includes one or more screens for filtering out debris in the working air flow received from the first cyclonic separation stage, i.e. the cyclone chamber 130. The separator 148 illustrated in the present embodiment comprises two mesh separator screens 150, 152 arranged in series and which have progressively smaller apertures. The first screen 150 is relatively course and separates out bulk debris into the bulk collection chamber 132. The second screen 152 is relatively fine and filters out fine debris, which drop into a fines collection chamber 154. The fines collection chamber 154 can be emptied simultaneously with debris in the bulk collection chamber 132. With this design, separation can happen in less space, making for a smaller overall cyclone module 126. The screens 150, 152 are easy to clean and are ready for use immediately after cleaning as compared to foam filters that need to dry.

The first separator screen 150 more particularly includes a separator body having an upper tubular frame 156 and a lower funnel portion 158 which defines the fines collection chamber 154. The tubular frame 156 has an at least partially open sidewall, and openings 160 are formed in the tubular frame 156 through which air can pass. The openings 160 are covered by a screen or mesh material 162. The funnel portion 158 has a closed sidewall through which air does not pass, and an open lower end 164.

The second separator screen 152 can include a tubular frame 166 with a closed lower end 168 and an at least partially open sidewall defining openings 170 which are covered by a screen or mesh material 172. The mesh material 172 can have a finer mesh size than the mesh material 162 of the first screen 150, such that finer debris are filtered out of the second screen 152.

A first stage debris passage 174 from the first cyclone chamber 130 can be defined between the lower portion of the tubular frame 156 and the funnel portion 158 and the side wall 134. The first stage debris passage 174 may extend continuously around the outer circumference of the lower portion of the tubular frame 156 and the funnel portion 158 and the inner circumference of the side wall 134. The open lower end 164 of the first screen 150 defines a debris outlet for the fines collection chamber 154, which collects dirt separated out by the second screen 152. The lower end 164 is spaced from the dirt door 136, such that the funnel portion 158, and therefore the second dirt collection chamber 136, does not meet the dirt door 136 when the dirt door 136 is closed.

An upper end of the separator 148 further includes a central opening 176 allowing air to pass out of the separator 148 and therefore defines an air outlet of the separator 148. The second screen 152 can surround the central opening 176 and extend downwardly therefrom.

The cover 138 can include a carry handle 178 that can be gripped by a user to facilitate lifting and carrying the entire vacuum cleaner 10 or just the cyclone module 126 when removed from the vacuum cleaner 10. The cover 138 can further include a module latch assembly 180, a pre-motor filter assembly 182 and the outlet conduit 146 for exhausting working air from the cyclone module 126. The cover 138 can be pivotally mounted to the module housing 128 by a hinge or otherwise removable to access the pre-motor filter assembly 182. The module latch assembly 180 includes a latch on the cyclone module 126 and a corresponding latch receiver (not shown) provided on the upright assembly 12 of the vacuum cleaner 10 (FIG. 1), and is used to selectively coupler or release the cyclone module 126 from the primary support section 16.

Downstream of the separator 148, the working airflow passes through the pre-motor filter assembly 182 before reaching the suction source 21. The pre-motor filter assembly 182 includes a filter chamber 188 and a filter media 190 removably received within the filter chamber 188. Some non-limiting examples of suitable filter media 190 include a non-porous or porous media, or a pleated or non-pleated media. For example, the filter media can be a non-porous, pleated filter, such as a HEPA filter. In another example, the filter media can be a porous, non-pleated filter, such as a sponge-type filter.

The outlet conduit 146 can communicate with the filter chamber 188 to conduct working air that has been filtered by the filter media 190 toward the suction source 21. As illustrated herein, the outlet conduit 146 can extend from a downstream plenum 192 of the filter chamber 188. It is noted that working air flows through the filter media 190 from a lower, upstream end to an upper, downstream end of the media.

The dirt door 136 includes a first door body 194 for closing the bulk collection chamber 132 and a platform 196 extending above the first door body 194 for closing the fines collection chamber 154. The platform 196 comprises an L-shaped support member 198 having one end fastened to the first door body 194 and a second end that defines a fines empty door 200. The support 198 is attached to the first door body 194 near a pivot axis Y of the dirt door 136 defined by the hinge 140 so that when the dirt door 136 is opened, the fines empty door 200 swings away from the open lower end 164 of the funnel 158 together with the first door body 194 so that debris can be emptied out of the bulk and fines collection chambers 132, 154 simultaneously.

The support 198 can further comprise ribs or tines 202 that protrude laterally towards the central axis X of the cyclone module 126. The tines 202 are configured to collect and prevent re-entrainment of hair and other debris in the bulk collection chamber 132. Upon opening the dirt door 136, the tines 202 pivot with the dirt door 136 and become oriented downwardly so that any debris collected thereon slides off and can be released into a waste container. The tines 202 are elongated such that the tines 202 have a length that is substantially greater than their thickness, and can have a rod-like or conical shape, which tends to improve shedding and release of debris when the dirt door 136 is opened.

In operation, the suction source 21, when energized, draws dirt and dirt-containing air from the suction nozzle 30 (FIG. 1) to the inlet conduit 144 and into the cyclone module 126, where the dirty air swirls around the first cyclone chamber 130. Larger or coarser debris falls into the bulk collection chamber 132. The working air, which may still contain some smaller or finer debris, then passes sequentially through the first screen 150, which can separate out some additional debris which can fall into the bulk collection chamber 132, and then through the second screen 152, which can separator out some additional finer debris. The finer debris separated by the second screen 152 can fall into the fines collection chamber 154. The working air, which may still contain some even smaller or finer debris, proceeds upwardly and enters the pre-motor filer assembly 182, where additional debris may be captured by the filter media 190. The working air then exits the cyclone module 126 via the outlet conduit 146, and passes through the suction source 21 before being exhausted from the vacuum cleaner 10. One or more additional filter assemblies may be positioned upstream or downstream of the suction source 21. To dispose of collected debris, the cyclone module 126 is detached from the vacuum cleaner 10 to provide a clear, unobstructed path for the debris to be emptied. Debris are emptied by opening the dirt door 136, which simultaneously empties the debris collected in the bulk and fines collection chambers 132, 154.

Figure 7:
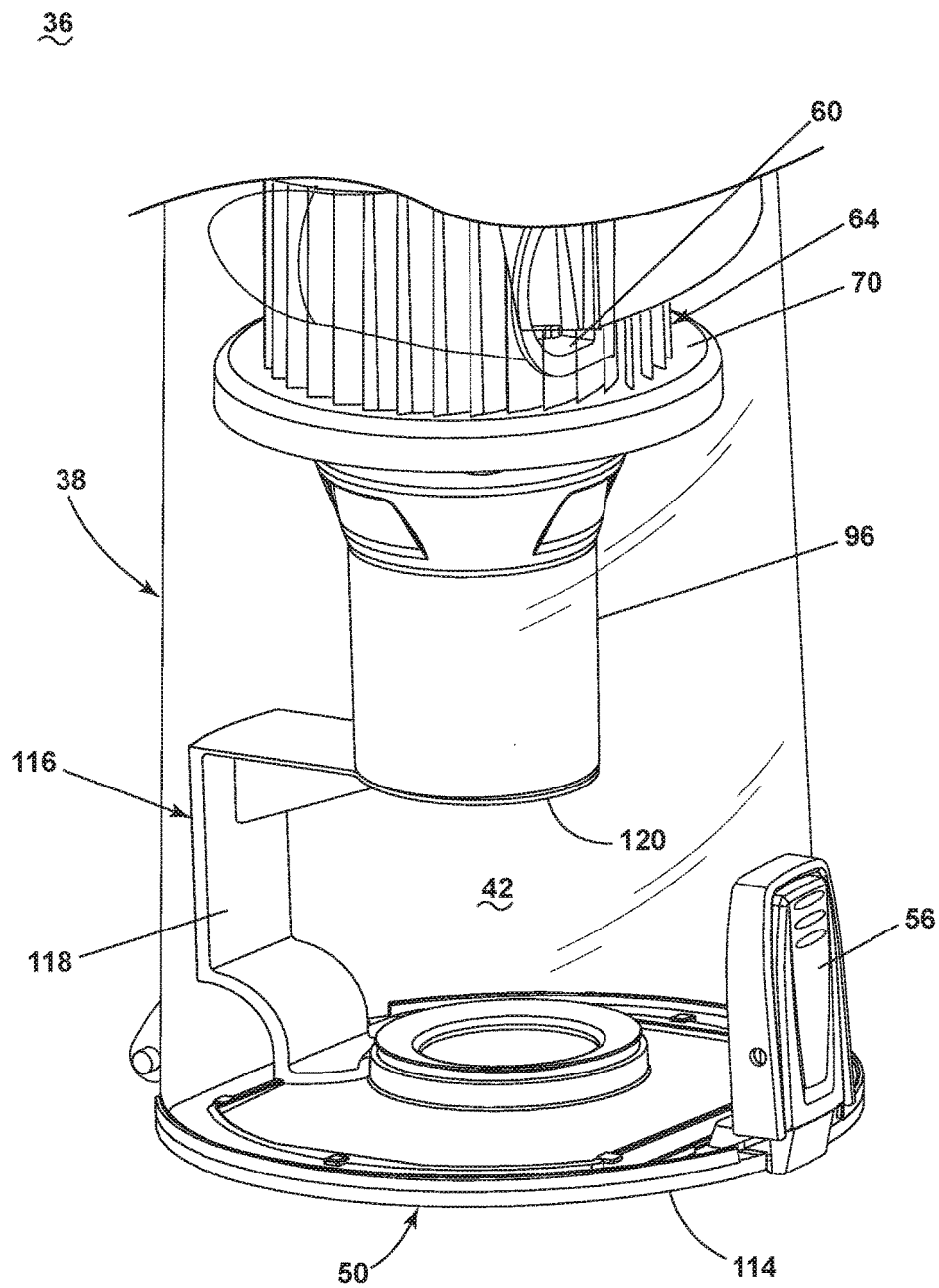
FIG. 7 is a perspective view of a third embodiment of a cyclone module for a vacuum cleaner.
Figure 8:
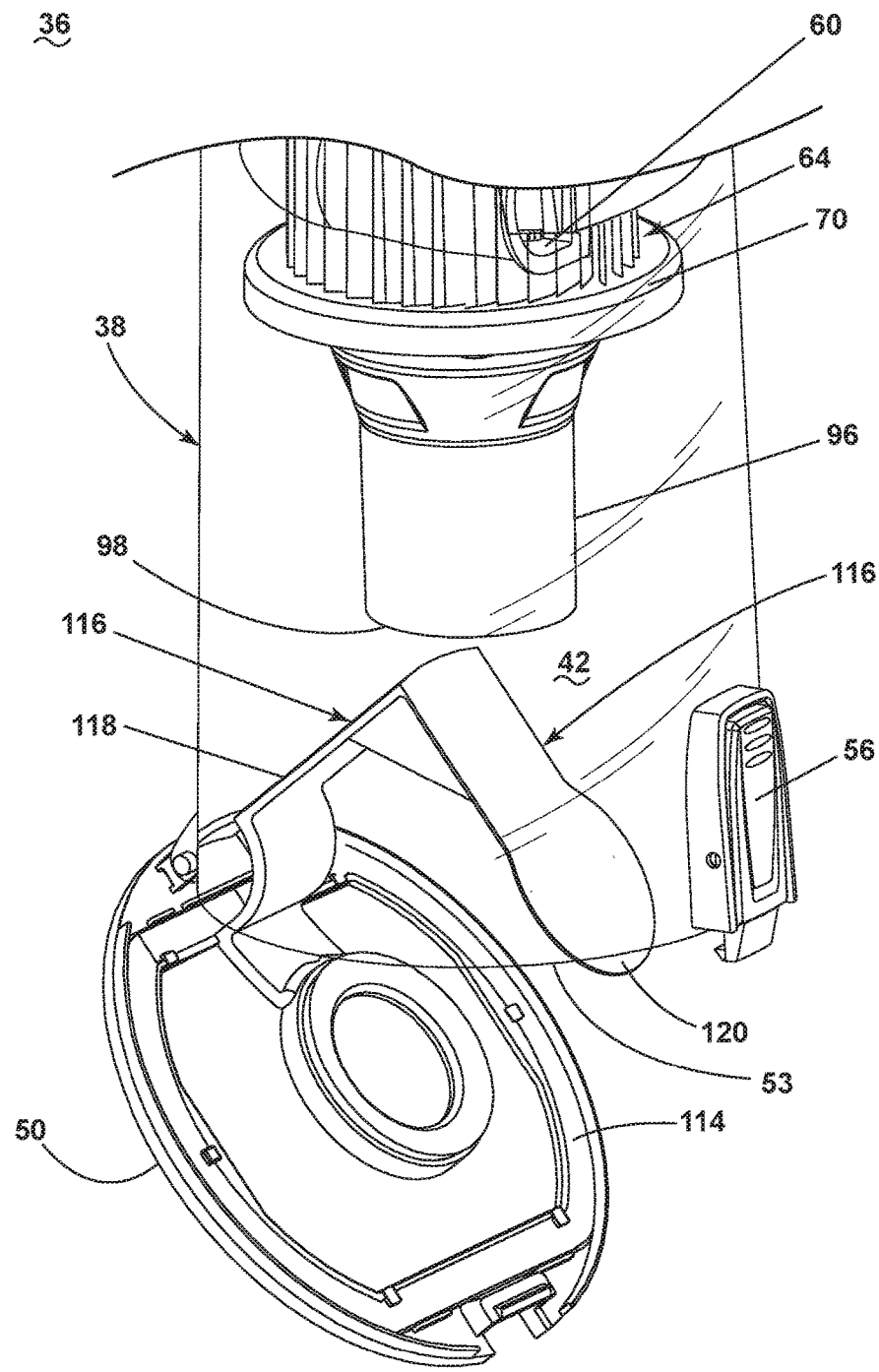
FIG. 8 is a perspective view of the cyclone module from FIG. 7, with a dirt door in an open position.

FIGS. 7-8 are perspective views of a third embodiment of a cyclone module for a vacuum cleaner. The cyclone module 36 is substantially identical to the cyclone module of FIGS. 2-4, and so like elements are identified using the same reference numerals. In the third embodiment, the fines collection tube 96 is shortened within the multi cyclone design and no tines are provided on the platform 116, allowing the lower portion of the housing 38 defining the first dirt collection chamber 42 to be unobstructed. The fines collection tube 96 is closed off via the platform 116 connected to the dirt door 50 when the dirt door 50 is closed, as shown in FIG. 7. As the dirt door 50 is opened to release the bulk debris, the fines platform 116 also opens to release the collected fines debris, as shown in FIG. 8. Similarly, modified version of the second embodiment of the cyclone module 126 shown in FIGS. 5-6 can be provided in which tines 202 are not provided on the platform and the fines collector is shortened for an unobstructed bulk collector.

Figure 9:
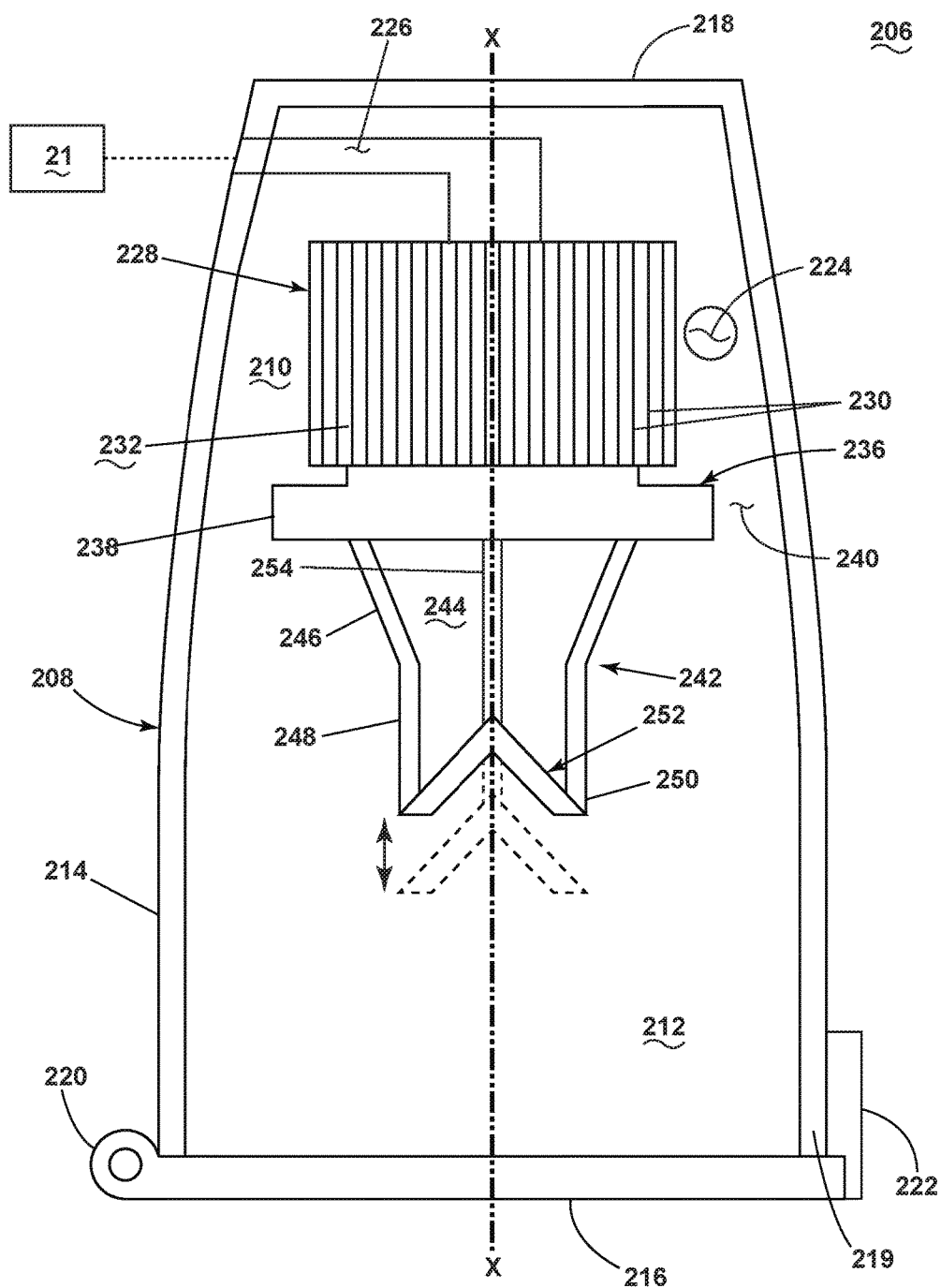
FIG. 9 is a sectional view of a fourth embodiment of a cyclone module for a vacuum cleaner.

FIG. 9 is a sectional view of a fourth embodiment of a cyclone module 206 for a vacuum cleaner. The cyclone module 206 can be used as the cyclone module 26 of the vacuum cleaner 10 shown in the FIG. 1, or for another vacuum cleaner. The cyclone module 206 of the fourth embodiment comprises a housing 208 at least partially defining a one-cyclone-stage separator including a cyclone chamber 210 for separating contaminants from a dirt-containing working airstream and an associated first or bulk collection chamber 212 which receives contaminants separated by the cyclone chamber 210. The cyclonic chamber 210 can be centered on a central axis X of the cyclone module 206, which can extend longitudinally through the housing 208. It is noted that while a one-cyclone-stage cyclone separator is illustrated herein, it is also contemplated that the cyclone module 206 can be configured with additional cyclonic separation stages.

The module housing 208 is common to the cyclone chamber 210 and the bulk collection chamber 212, and includes a side wall 214, a bottom wall 216, and a top wall or cover 218. The side wall 214 is illustrated herein as being generally cylindrical in shape, with a diameter that increases in a direction toward the bottom wall 216. The side wall 214 includes a lower or bottom edge 219 that defines a debris outlet for the bulk collection chamber 212. The bottom wall 216 in the illustrated embodiment comprises a dirt door that can be selectively opened, such as to empty the contents of the bulk collection chamber 212.

The dirt door 216 is pivotally mounted to the side wall 214 by a hinge 220. A door latch 222 is provided on the side wall 214, opposite the hinge 220, and can be actuated by a user to selectively release the dirt door 216 from engagement with the bottom edge of the side wall 214. The door latch 222 can comprise a latch that is pivotally mounted to the side wall 214 and spring-biased toward a closed position shown in FIG. 9. By pressing the upper end of the door latch 222 toward the side wall 214, the lower end of the door latch 222 pivots away from the side wall 214 and releases the dirt door 216, under the force of gravity, to an open position, allowing accumulated dirt to be emptied from the bulk collection chamber 212 through the open bottom of the module housing 208.

An air inlet to the cyclone module 206 can be at least partially defined by an inlet conduit 224. An air outlet from the cyclone module 206 can be at least partially defined by an outlet conduit 226 extending through the cover 218. The inlet conduit 224 is in fluid communication with the suction nozzle 30 (FIG. 1) and the outlet conduit 226 is in fluid communication with the vacuum fan/motor assembly 21 within the motor cavity 20 (FIG. 1).

The cyclone module 206 further includes a secondary separator 228 within the module housing 208, fluidly downstream of the cyclone chamber 210. The separator 228 can be positioned in the center of the cyclone chamber 210 and in the present embodiment is provided as a grill for filtering out debris in the working air flow received from the first cyclonic separation stage, i.e. the cyclone chamber 210. The grill 228 can be positioned in the center of the cyclone chamber 210 and includes a generally cylindrical body having a plurality of vanes or louvers 230 extending longitudinally between lower and upper ends of the grill 228. Openings 232 are formed between adjacent louvers 230 through which air can pass. As illustrated, the louvers 230 are elongated along the direction of the central axis of the of the cyclone module 206. An upper end of the grill 228 is open to allow air to pass out of the separator 228 and into the outlet conduit 226. While not shown, a foam or paper filter may be provided on the exterior or interior of the grill 228. Also, while the separator is shown as a grill, it is understood that other separators may be used, such as one or more mesh screens, like the second embodiment shown in FIGS. 5-6.

A separator plate 236 can extend radially outwardly from a lower end of the grill 228 and includes a downwardly depending peripheral lip 238. The separator plate 236 separates the cyclone chamber 210 from the bulk collection chamber 212 and can define the boundary therebetween. A debris passage 240 from the cyclone chamber 210 can be defined between the separator plate 236 and the side wall 214. The debris passage 240 may extend continuously around the outer circumference of the separator plate 236 and the inner circumference of the side wall 214.

A fines collector tube 242 is provided beneath an open lower end of the grill 228 and defines a fines collection chamber 244. The fines collector tube 242 includes an upper funnel portion 246 and a lower tube portion 248 with an open lower end 250. The open lower end 250 defines a debris outlet for the fines collection chamber 244. The lower end 250 is spaced from the dirt door 216, such that the fines collector tube 242 does not meet the dirt door 216 when the dirt door 216 is closed.

A fines empty door 252 is slidably mounted within the cyclone module 206 to selectively close the lower open end 250 of the fines collector tube 242. In one configuration, the fines empty door 252 comprises a conical-shaped door member that is slidably mounted on a guide 254 in the fines collector tube 242. The guide 254 can be oriented coaxially within the cyclone axis X. In one example, the guide 254 can comprise a rod and the fines empty door 252 can be mounted to a lower end of the rod. The rod can be slidably mounted within at least one bearing (not shown) such that the rod is vertically movable along the cyclone axis X. The fines empty door 252 is movable between an upward, "closed" position, shown in solid line in FIG. 9, and a downward, "open", position shown in dotted line in FIG. 9. In the downward, "open" position, the fines empty door 252 is spaced apart from the bottom of the fines collector tube 242 defining a gap through which fine debris may be emptied into the bulk collection chamber 212. In the upward, "closed" position, the fines empty door 252 seals against the open lower end 250 of the fines collector tube 242 defining the fines collection chamber 244.

The fines empty door 252 is actuated by vacuum pressure within the cyclone module 206. More specifically, when the cyclone module 206 is fluidly connected to the suction source 21 that generates a working air flow through the module 206, the vacuum created within the module 206 lifts the fines empty door 252 into the closed position so that fine debris can be collected in the enclosed fines collection chamber 244. Conversely, when the suction source 21 is turned off or disconnected such that working air flow through the module 206 stops, the fines empty door 252 or drops down to the open position. Fine debris collected within the fines collection chamber 244 slides down the conical-shaped door 252 through the gap and into the bulk collection chamber 212 under the force of gravity. The fines empty door 252 can be actuated entirely by vacuum pressure and weight of the fines empty door 252. Alternatively, one or more springs can be mounted between the fines empty door 252 and fines collector tube 242 or another portion of the cyclone module 206 to bias the fines empty door 252 into either of the "open" or "closed" positions.

While not shown, the cyclone module 206 can further include a carry handle that can be gripped by a user to facilitate lifting and carrying the entire vacuum cleaner 10 or just the cyclone module 206 when removed from the vacuum cleaner 10, and/or a pre-motor filter assembly for filtering the working air flow downstream of the grill 228 but before the air reaches the motor/fan assembly 21.

In operation, the suction source 21, when energized, draws dirt and dirt-containing air from the suction nozzle 30 (FIG. 1) to the inlet conduit 224 and into the cyclone module 206, where the dirty air swirls around the cyclone chamber 210. Larger or coarser debris falls into the bulk collection chamber 212. The working air, which may still contain some smaller or finer debris, then passes through the grill 228, which can separate out some additional debris. The working air continues to swirl around the inside of the grill 228 and upper funnel portion 246, which causes smaller or finer debris to separate and fall into the fines collection chamber 244. The working air then exits the cyclone module 206 via the outlet conduit 226, and passes through the suction source 21 before being exhausted from the vacuum cleaner 10. One or more additional filter assemblies may be positioned upstream or downstream of the suction source 21. To dispose of collected debris, the suction source 21 is energized, which causes the fines empty door 252 to open in the absence of vacuum pressure, and the fine debris to fall into the bulk collection chamber 212. The cyclone module 206 is then detached from the vacuum cleaner 10 to provide a clear, unobstructed path for the debris to be emptied. Debris are emptied by opening the dirt door 216, which empties the debris collected in the bulk and fines collection chambers 212, 244, which now reside in the bulk collection chamber 212.

Figure 10:
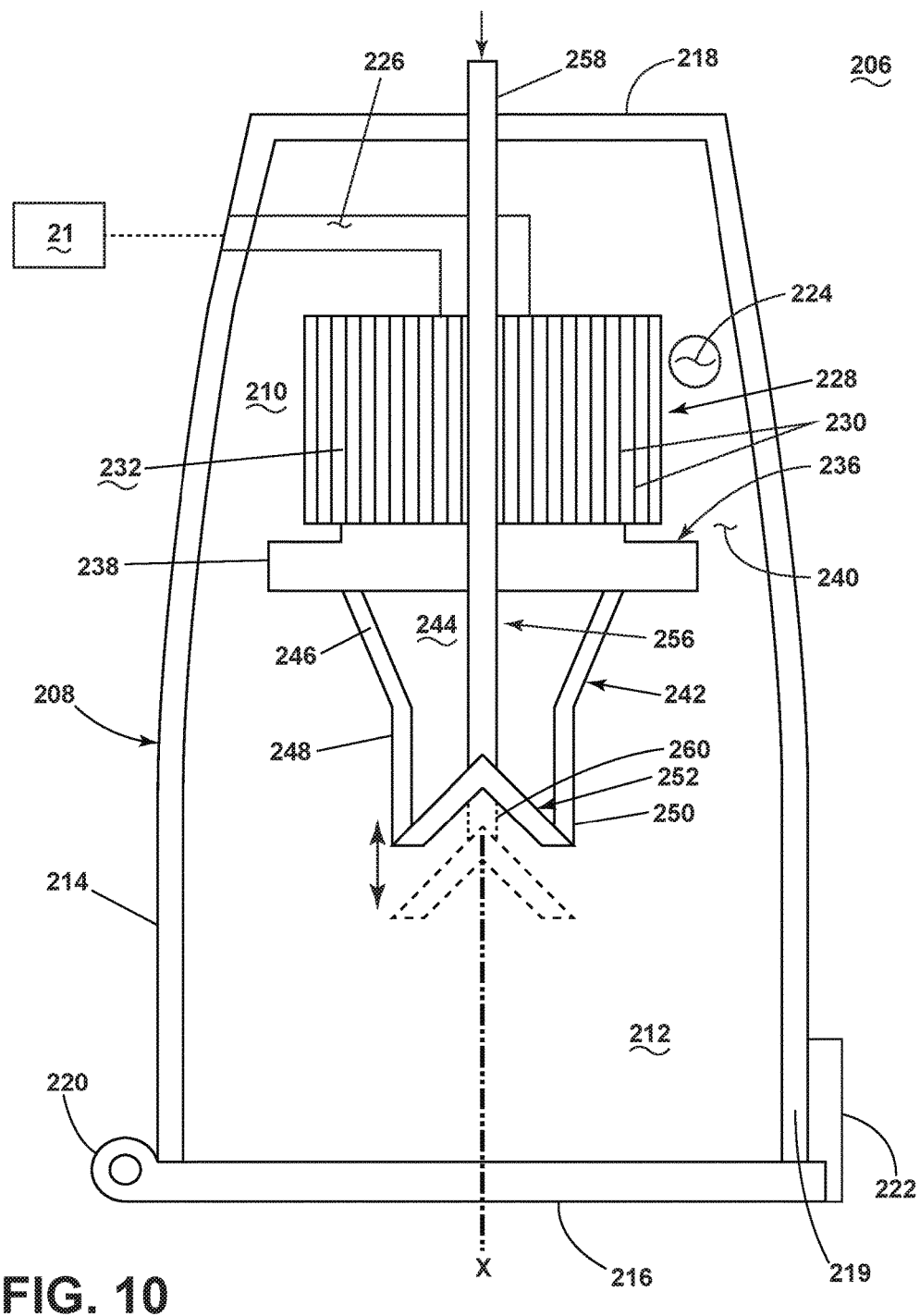
FIG. 10 is a sectional view of a fifth embodiment of a cyclone module for a vacuum cleaner.

FIG. 10 is a sectional view of a fifth embodiment of a cyclone module 206 for a vacuum cleaner. The cyclone module 206 is substantially identical to the cyclone module 206 of FIG. 9, and so like elements are identified using the same reference numerals. In the fifth embodiment, unlike the forth embodiment, the fines empty door 252 is not configured to automatically open and close.

The fines empty door 252 is connected to an elongate push rod 256 that extends upwardly through the fines collector tube 242 and is accessible by a user from the exterior of the cyclone module 206. The push rod 256 includes a user-engagable first end 258 which is exterior of the cyclone housing 208, such as above the cover 218, for access by a user from the exterior of the cyclone module 206, and a second end 260 which engages or couples with the fines empty door 252. In this configuration, the fines empty door 252 does not automatically open and close based on the presence or absence of vacuum pressure within the cyclone module 206. Instead, a user can manually open or close the fines empty door 252 by pushing the push rod 256 downwardly, which moves the fines empty door 252 into the "open" position, shown in dotted line in FIG. 10. Conversely, to close the fines empty door 252, a user can pull the push rod 256 upwardly to seat the fines empty door 252 in the "closed" position, shown in solid like in FIG. 10.

In operation, to empty the bulk and fines collection chambers 212, 244, a user first empties the fines collector tube 242 into the bulk collection chamber 212 by depressing the push rod 256 and emptying the debris into the bulk collection chamber 212. Next, a user can empty the contents of the bulk collection chamber 212, including the contents of the fines collection chamber 244, by opening the hinged dirt door 216 on the cyclone housing 208.

Figure 11:
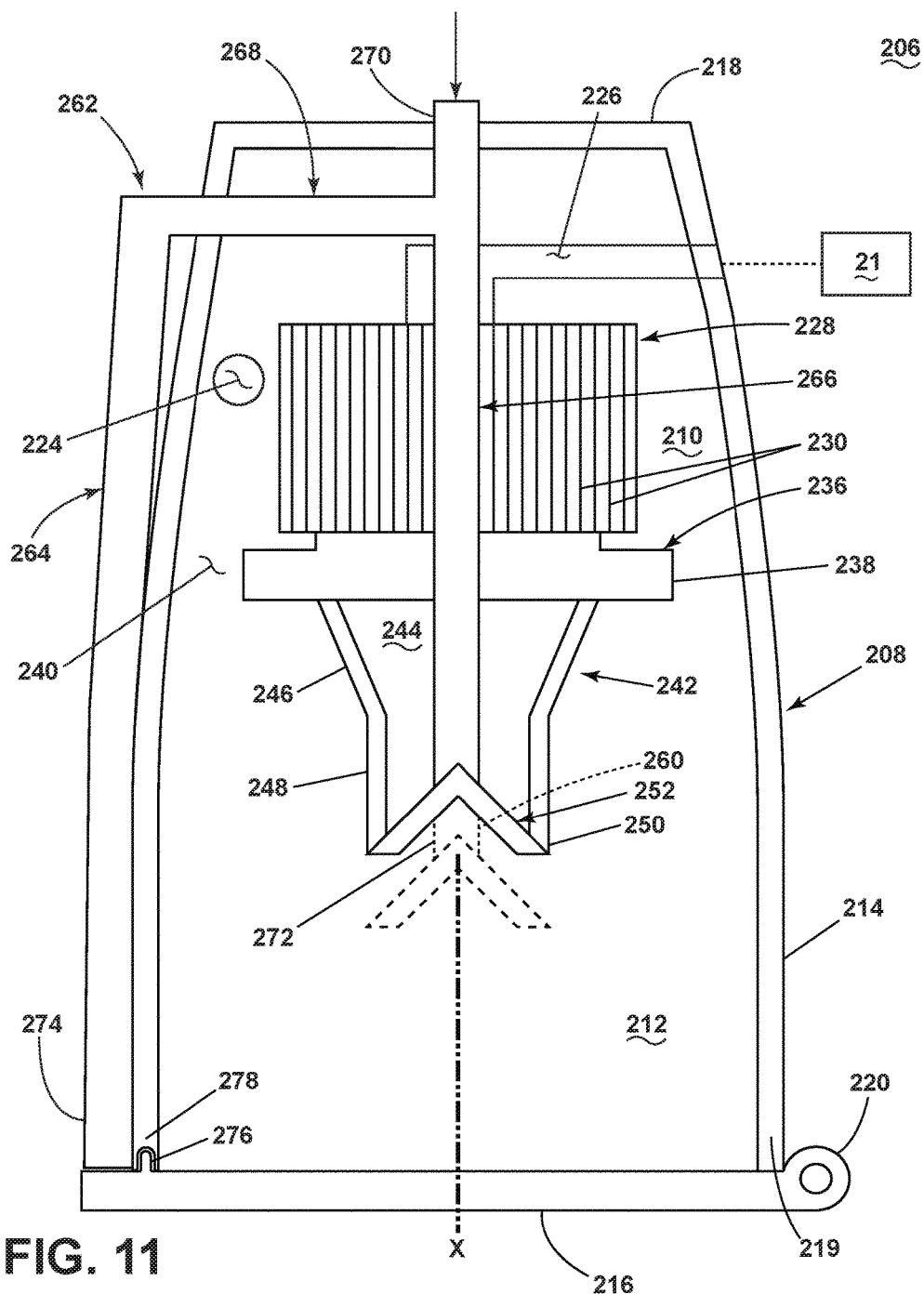
FIG. 11 is a sectional view of a sixth embodiment of a cyclone module for a vacuum cleaner.

FIG. 11 is a sectional view of a sixth embodiment of a cyclone module 206 for a vacuum cleaner. The cyclone module 206 is substantially identical to the cyclone module 206 of FIG. 9, and so like elements are identified using the same reference numerals. In the sixth embodiment, unlike the fourth embodiment, the fines empty door 252 is not configured to automatically open and close, but rather uses a push rod like the fifth embodiment.

The fines empty door 252 and primary dirt door 216 are both connected to a push rod assembly 262 that is configured to open the fines empty door 252 and primary dirt door 216 simultaneously. The push rod assembly 262 comprises a primary push rod 264 and a secondary push rod 266 interconnected by a support frame 268. The secondary push rod 266 is identical to the push rod 256 of the previous embodiment, and comprises an elongate rod extending upwardly through the fines collector tube 242 and having an upper end that is accessible by a user from the exterior of the cyclone module 206. The push rod 266 includes a user-engagable first end 270 which is exterior of the cyclone housing 208, such as above the cover 218, for access by a user from the exterior of the cyclone module 206, and a second end 272 which engages or couples with the fines empty door 252.

The support frame 268 extends laterally from an upper portion of the secondary push rod 266 and is connected to an upper end of a primary push rod 264. The primary push rod 264 extends downwardly from the support frame 268 to a terminal end 274, which is in register with the primary dirt door 216 in a position opposite the door hinge 220. The primary push rod 264 can be mounted adjacent to the outer side wall 214 of the cyclone module 206, or alternatively can be mounted adjacent to the inner surface of the side wall 214. Likewise, the support frame 268 may be exterior to or interior of the cyclone housing 208.

In operation, to empty the cyclone module 206, a user depresses the fines push rod 266 downwardly, which moves the fines empty door 252 into the "open" position shown in dotted line in FIG. 11, while simultaneously moving the primary push rod 264 downwardly so the terminal end 274 pushes the primary dirt door 216 open, so that debris from the bulk and fines collection chambers 212, 244 can be emptied simultaneously.

The cyclone module 206 can comprise one or more retaining features on the primary dirt door 216 and on the open end of the cyclone module housing 208 for securing the primary dirt door 216 to the housing 208 in the closed position. In one configuration, the retaining feature can include a catch or detent 276 on the primary dirt door 216 and a mating detent or latch 278 on the cyclone module housing 208. The primary push rod 264 can be configured to release the catch or detent 276 from the mating detent or latch 278, such that the primary dirt door 216 can be opened upon depressing the push rod assembly 262. The push rod assembly 262 can be spring biased so that it automatically returns to the upward "closed" position shown in solid line in FIG. 11. Alternatively, the push rod assembly 262 can be configured without springs so that the primary dirt door 216 pushes the push rod assembly 262 into the upward "closed" position when the primary dirt door 216 is returned to the closed position and retained to the open bottom of the housing 208.

The above described embodiments provide for a variety of benefits, including improved debris collection in vacuum cleaner cyclone modules. These features, alone or in combination, create a superior-performance cyclone module. One advantage that may be realized in the practice of some embodiments of the described cyclone module is that a fines collection chamber has been provided which is elevated with respect to a bulk collection chamber to provide more space for debris collection in the bulk collection chamber.

Another advantage that may be realized in the practice of some embodiments of the described cyclone modules is that the bulk and fines collection chambers can be emptied simultaneously. Simultaneous emptying offers a convenient, one-step process for emptying all the dirt collected by the module, ensuring the user that all dirt has been emptied at once. Also, a user does not have to a touch any of the dirty areas of the module to empty the fines collection chamber, because its emptying has been integrated with the bulk collection chamber.

Another advantage that may be realized in the practice of some embodiments of the described cyclone modules is that the debris catching tines are provided on the emptying door of the cyclone module, which collect elongated or string-like debris and prevents such debris from wrapping around and blocking or clogging the openings of the grill. Integrating the tines with the emptying door has the further advantage of automatically cleaning debris off the tines when the cyclone module is emptied.

To the extent not already described, the different features and structures of the various embodiments of the cyclone module, may be used in combination with each other as desired, or may be used separately. That one cyclone module is illustrated herein as having all of these features does not mean that all of these features must be used in combination, but rather done so here for brevity of description. Furthermore, while the cyclone module is shown as being applied to an upright vacuum cleaner configuration, the cyclone module can alternatively be applied to canister-type, stick-type, central, handheld, or portable vacuum cleaners, which share many of the same components as the upright vacuum cleaner 10. Still further, while the vacuum cleaner 10 shown herein includes a vacuum collection system for creating a partial vacuum to suck up debris (which may include dirt, dust, soil, hair, and other debris) from a surface to be cleaned and collecting the removed debris in a space provided on the vacuum cleaner 10 for later disposal, in some embodiments of the invention, not illustrated herein, the vacuum cleaner 10 can additionally have fluid delivery capability, including applying liquid or steam to the surface to be cleaned, and/or fluid extraction capability. Thus, the various features of the different embodiments may be mixed and matched in various cyclone module and vacuum cleaner configurations as desired to form new embodiments, whether or not the new embodiments are expressly described.

While the invention has been specifically described in connection with certain specific embodiments thereof, it is to be understood that this is by way of illustration and not of limitation. Reasonable variation and modification are possible with the scope of the foregoing disclosure and drawings without departing from the spirit of the invention which, is defined in the appended claims. Hence, specific dimensions and other physical characteristics relating to the embodiments disclosed herein are not to be considered as limiting, unless the claims expressly state otherwise.

What is claimed is:

1. A cyclone module for a vacuum cleaner comprising:
a module housing defining a longitudinal axis of the module;
a primary separator comprising a cyclone chamber;
a bulk collection chamber having a bottom end defining a first debris outlet;
at least one secondary separator fluidly downstream from the primary separator;
a fines collection chamber having a bottom end defining a second debris outlet;
a first door coupled with the module housing and closing the first debris outlet; and
a second door having a lower surface positioned above the first door along the longitudinal axis to define a space which is part of the bulk collection chamber, the second door closing the second debris outlet;
wherein the bottom end of the fines collection chamber is above the bottom end of the bulk collection chamber, with the second debris outlet spaced above the first door along the longitudinal axis of the module.

2. The cyclone module of claim 1, wherein the second door is coupled with the first door for movement therewith, such that the bulk and fines collection chambers are emptyable simultaneously by opening the first door.

3. The cyclone module of claim 2 and further comprising a plurality of tines between the first and second doors.

4. The cyclone module of claim 3, wherein the plurality of tines are transverse to the longitudinal axis of the module when the first door is closed and point generally downwardly when the first door is open.

5. The cyclone module of claim 2, wherein the first door comprises a support member supporting the second door above the first door.

6. The cyclone module of claim 5, wherein the first door is pivotally mounted to the module housing by a hinge, and the support member is adjacent the hinge.

7. The cyclone module of claim 5, wherein the support member further comprises tines that are transverse to the longitudinal axis of the module when the first door is closed.

8. The cyclone module of claim 1, wherein the at least one secondary separator comprises at least one secondary cyclone chamber.

9. The cyclone module of claim 1, wherein the module housing is common to the cyclone chamber and the bulk collection chamber, and includes a side wall having an open lower end defining the first debris outlet, wherein the first door is coupled with the side wall to define a bottom of the module housing.

10. The cyclone module of claim 1, and further comprising a grill guiding working air from the primary separator to the at least one secondary separator.

11. The cyclone module of claim 1, wherein the at least one secondary separator comprises a grill having a generally cylindrical body with a plurality of openings through which air can pass.

12. The cyclone module of claim 1, wherein the at least one secondary separator comprises at least one mesh screen.

13. The cyclone module of claim 1, wherein the at least one secondary separator comprises first and second separator screens arranged in series and which have progressively smaller apertures.

14. The cyclone module of claim 13, wherein the first separator screen comprises an upper frame and a lower portion which defines the fines collection chamber, and wherein the upper frame has openings covered by a first mesh material through which air can pass and the lower portion has a closed sidewall through which air does not pass and an open lower end defining the second debris outlet.

15. The cyclone module of claim 14, wherein the second separator screen comprises a frame having openings covered by a second mesh material through which air can pass and a closed lower end through which air does not pass.

16. The cyclone module of claim 1, wherein the fines collection chamber is defined by a tubular wall spaced radially inwardly from the module housing.

17. The cyclone module of claim 1, wherein the primary separator, the bulk collection chamber, the at least one secondary separator, and the fines collection chamber are aligned with the longitudinal axis of the module.

18. The cyclone module of claim 1, and further comprising a pre-motor filter assembly fluidly downstream of the at least one secondary separator and upstream of an air outlet of the module housing.

19. The cyclone module of claim 1, and further comprising a push rod operably coupled with the first and second doors and configured to open the first door and second door simultaneously.

20. A vacuum cleaner comprising:
a working air path that extends from a dirty air inlet to a clean air outlet;
a suction nozzle defining the dirty air inlet of the working air path;
a suction source configured to generate a working airstream through the working air path; and
a cyclone module forming a portion of the working air path fluidly downstream of the suction nozzle, and comprising:
a module housing defining a longitudinal axis of the module;
a primary separator comprising a cyclone chamber;
a bulk collection chamber having a bottom end defining a first debris outlet;

at least one secondary separator fluidly downstream from the primary separator;

a fines collection chamber having a bottom end defining a second debris outlet;

a first door coupled with the module housing and closing the first debris outlet; and a second door having a lower surface positioned above the first door along the longitudinal axis to define a space which is part of the bulk collection chamber, the second door closing the second debris outlet;

wherein the bottom end of the fines collection chamber is above the bottom end of the bulk collection chamber, with the second debris outlet spaced above the first door along the longitudinal axis of the module.

* * * * *